No. 756,097.  
Patented March 29, 1904.

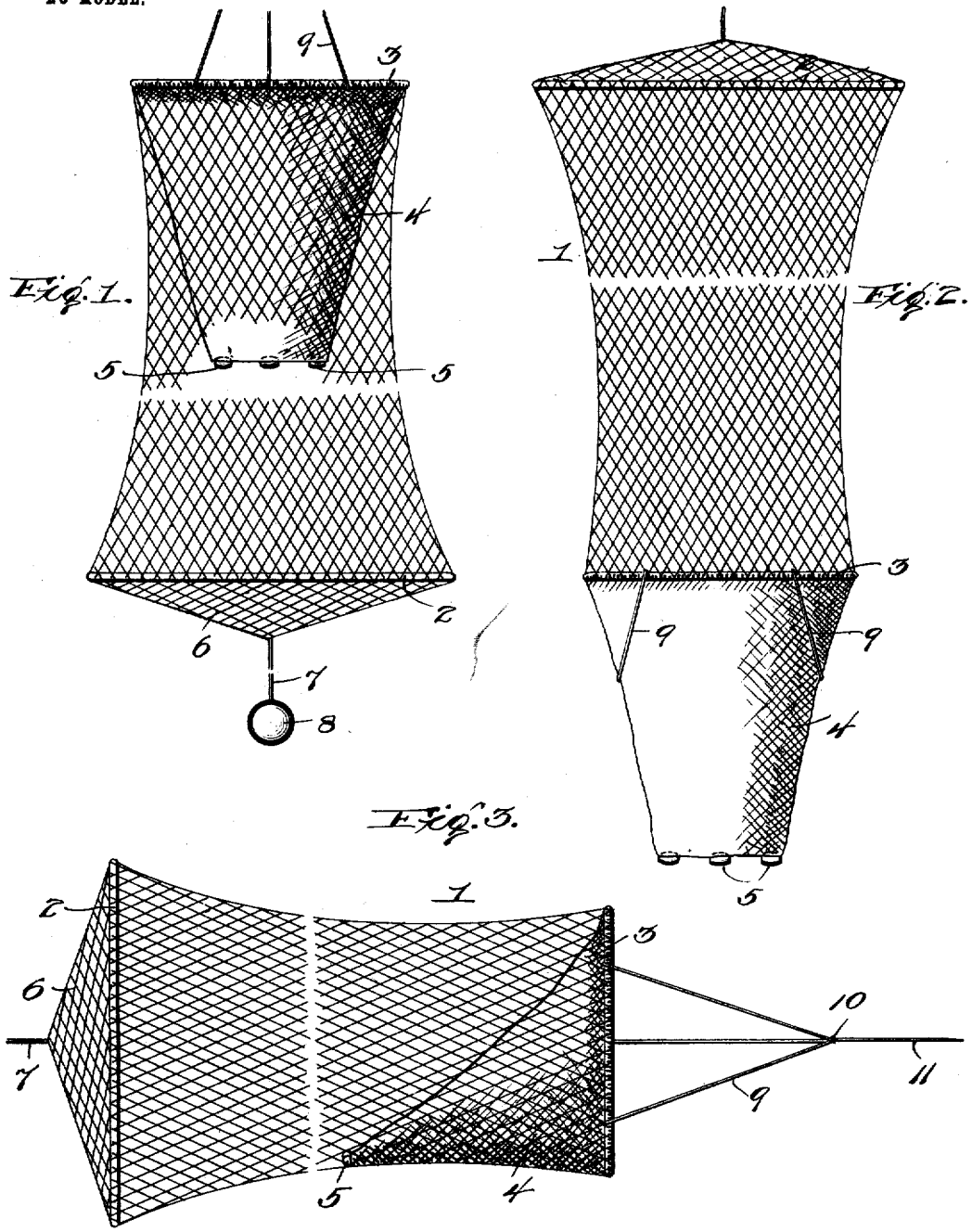

UNITED STATES PATENT OFFICE.

WILLIAM B. BURROUGHS, OF BALTIMORE, MARYLAND.

NET FOR HOLDING LIVE FISH.

SPECIFICATION forming part of Letters Patent No. 756,097, dated March 29, 1904.

Application filed June 23, 1903. Serial No. 162,707. (No model.)

*To all whom it may concern:*

Be it known that I, WILLIAM B. BURROUGHS, a citizen of the United States, residing at Baltimore city, in the State of Maryland, have invented certain new and useful Improvements in Nets for Holding Live Fish, of which the following is a specification.

My invention relates to nets for holding live fish, and it is designed to take the place of the awkward heavy wooden live-box now in common use to keep fresh and alive fish as they are caught.

The device is adapted to attach to a boat or other object in convenient position to receive the fish as the same are taken from the hook or as they are in any other manner caught.

The object of the invention is to produce a simple, durable, and cheap device that will be readily collapsible to economize space and which may be conveniently carried as a part of a fisherman's outfit.

A further object of the invention is to so construct the device that it can also be used to keep the fish therein from day to day without the danger of the fish dying or escaping.

To this end the invention consists in the novel combination and arrangement of the parts about to be described, and the points of novelty will be set forth in the claims.

Referring to the drawings, Figure 1 is an elevation of the net, partly broken away, showing the same in the position to receive the fish. Fig. 2 is a side elevation of the device, showing the same inverted, or in the position in which the fish are readily removed from the net; and Fig. 3 is a view showing the device in horizontal position, or in the position it occupies when entirely submerged and anchored for the purpose of keeping the fish for considerable time.

Referring to the drawings, the numeral 1 represents the net proper, which I preferably make in substantially cylindrical form of seine-cord, which in carrying out my invention I provide at the bottom with a stretching or expanding ring or hoop 2, which is secured to the net in the manner usually employed for these connections in devices of this character. The upper part of the net is held expanded by a second ring or stretcher 3, preferably a little smaller than the ring 2, and to which I attach a funnel portion 4, made, preferably, of muslin, as I find that this material interferes less with putting the fish in the net, as well as taking them out, the mesh of this material being so small as not to interfere to a considerable degree with the fins of the fish. This funnel-shaped portion is open at the bottom and is provided with a series of weights 5, which are distributed in circular fashion around the lower edge of this portion and serve to hold the funnel in the position shown in Fig. 1 or in a convenient position to receive the fish. To the bottom ring a continuation of the net is attached, forming a bottom 6, to which I preferably attach a short cord 7, which may be provided with a sinker or anchor 8 for the purpose that will be presently described. Secured to the upper ring is a bridle composed of three cords 9, brought to a common center at 10 and to which is attached a holding-cord 11, by which the whole device may be suspended from a boat or other object.

When it is desired to take the fish from the net, it is only necessary to invert the net and the weights on the end of the funnel portion will cause the funnel to be inverted and assume the position shown in Fig. 2, in which position of the net and funnel the fish can be readily removed.

Referring particularly to Fig. 3, in which the whole device is in horizontal position, or in the position it assumes when submerged, it will be seen that the net is anchored in such a way as to prevent the net from collapsing. In this position the funnel will be closed at the bottoms by the weights, as shown, thus preventing the escape of the fish.

I have found that by distributing the weights in circular fashion around the funnel portion the lower end is more effectually retained in open position when the net is in a position to receive the fish and closed when said net is in the position shown in Fig. 3.

I do not desire to be understood as limiting myself to the number of hoops or stretching-rings used, as it is obvious that any considerable number may be employed and secured to the net in the usual manner, which may in some instances be desirable where the device is to be often used to keep the fish for considerable time.

While I have shown the net formed of coarse-mesh material, it will be understood that it may be made of fine gauze or net, thereby adapting it for use in preserving live bait, such as minnows. This will overcome one of the objections to bait-buckets requiring the water to be frequently changed in order to keep the bait in good condition for use.

While I have shown the stretching device in the upper part of the net in the form of a circle, it will be understood that I do not limit myself to this shape, for in some instances it may be found desirable to make the stretching device D shape, thus causing it to present one straight side, so that it would rest firmly and evenly against the object to which it might be attached.

I claim—

1. A device of the character described, comprising a net open at one end, suitable stretching devices, a funnel-shaped portion secured to the open end of the net and provided with weights, substantially as and for the purpose set forth.

2. A device of the character described, comprising a net open at one end, suitable stretching devices, a funnel-shaped portion entering the open end of the net and open at its bottom, weights attached to the funnel portion for the purpose set forth, and securing means for the whole device, substantially as described.

3. A device of the character described, comprising a net open at one end, an expanding or stretching ring at each end of said net, a funnel portion open at its lower end and entering the open end of the net, weights attached to the funnel portion for the purpose set forth, and securing means for the whole device, substantially as described.

4. A device of the character described, comprising a collapsible net open at one end, and having a stretching or expanding ring at each end, a cone of flexible material entering the open end of the net and having weights secured to its bottom end for the purpose set forth, and securing means for the net.

5. A device of the character described, comprising a net closed at one end, suitable stretching devices, a receiving portion open at its lower end and entering the open end of the net, said receiving portion being of collapsible material and provided with weights for the purpose set forth.

In testimony whereof I affix my signature in presence of two witnesses.

WILLIAM B. BURROUGHS.

Witnesses:
 JOHN G. BARTRAM,
 WILLIAM P. HEPPERLA.